United States Patent
Ko et al.

(10) Patent No.: US 9,702,607 B2
(45) Date of Patent: Jul. 11, 2017

(54) AIR-CONDITIONER SYSTEM FOR VEHICLE AND METHOD FOR CONTROLLING SAME

(71) Applicant: HANON SYSTEMS, Daejeon (KR)

(72) Inventors: Jaewoo Ko, Daejeon (KR); Gyuik Han, Daejeon (KR); Saedong Eom, Daejeon (KR); Kilsang Yoon, Daejeon (KR); Inkeun Kang, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 14/895,686

(22) PCT Filed: Sep. 4, 2014

(86) PCT No.: PCT/KR2014/008299
§ 371 (c)(1),
(2) Date: Dec. 3, 2015

(87) PCT Pub. No.: WO2015/034277
PCT Pub. Date: Mar. 12, 2015

(65) Prior Publication Data
US 2016/0195322 A1    Jul. 7, 2016

(30) Foreign Application Priority Data

Sep. 4, 2013 (KR) .................. 10-2013-0105955
Apr. 24, 2014 (KR) .................. 10-2014-0049196

(51) Int. Cl.
*F25B 49/02* (2006.01)
*B60H 1/32* (2006.01)
*F25B 41/06* (2006.01)

(52) U.S. Cl.
CPC ......... *F25B 49/022* (2013.01); *B60H 1/3205* (2013.01); *B60H 1/3216* (2013.01);
(Continued)

(58) Field of Classification Search
CPC F25B 41/062; F25B 49/022; F25B 2600/023; F25B 2600/21; F25B 2600/2513
(Continued)

(56) References Cited

U.S. PATENT DOCUMENTS 4,878,355 A    11/1989   Beckey et al.
6,044,651 A *   4/2000   Reason ................ B60H 1/3208
                                                62/158

(Continued)

FOREIGN PATENT DOCUMENTS

KR    20010048164 A    6/2001
KR    20060131178 A    12/2006
(Continued)

OTHER PUBLICATIONS

Tomczyk, John. "Analyzing Refrigerant Flow Problems." ACHRNEWS RSS. N.p., Jan. 12, 2004. Web. Jul. 27, 2016.*
(Continued)

Primary Examiner — Jonathan Bradford
(74) Attorney, Agent, or Firm — Dickinson Wright PLLC

(57) ABSTRACT

The present invention relates to an air-conditioner system for a vehicle and a method for controlling the same, and more particularly, to an air-conditioner system for a vehicle and a method for controlling the same which can change a target superheat degree depending on variation in an amount of refrigerant discharged from a compressor, namely, gradually decrease the target superheat degree by stages as the amount of refrigerant discharged from the compressor decreases, and control an electronic expansion valve based on the target superheat degree dropping by stages, thereby preventing performance degradation of an air conditioner and stabilizing the system by restraining a change in the superheat degree in an area where an amount of refrigerant discharged from a compressor varies.

7 Claims, 8 Drawing Sheets

(52) U.S. Cl.
CPC .... *F25B 41/062* (2013.01); *B60H 2001/3242* (2013.01); *B60H 2001/3279* (2013.01); *B60H 2001/3285* (2013.01); *F25B 2341/0653* (2013.01); *F25B 2600/023* (2013.01); *F25B 2600/21* (2013.01); *F25B 2600/2513* (2013.01); *F25B 2700/13* (2013.01)

(58) Field of Classification Search
USPC .................................................. 62/222, 225
See application file for complete search history.

(56) References Cited

U.S. PATENT DOCUMENTS

| | | | | |
|---|---|---|---|---|
| 6,118,099 | A | * | 9/2000 | Lake ................. B60H 1/00907 165/43 |
| 6,336,335 | B2 | * | 1/2002 | Ota ........................... 123/198 R |
| 2011/0192177 | A1 | * | 8/2011 | Bae .......................... F24F 3/06 62/115 |

FOREIGN PATENT DOCUMENTS

| | | |
|---|---|---|
| KR | 20080096821 A | 11/2008 |
| KR | 20100027573 A | 3/2010 |

OTHER PUBLICATIONS

International Search Report dated Jan. 9, 2014 from corresponding International Patent Application Serial No. PCT/KR2014/008299.

* cited by examiner

PRIOR ART

PRIOR ART

PRIOR ART

AIR-CONDITIONER SYSTEM FOR VEHICLE AND METHOD FOR CONTROLLING SAME

CROSS-REFERENCE TO RELATED APPLICATIONS

This application is a National Stage of International Application No. PCT/KR2014/008299, filed Sep. 4, 2014, which claims the benefit and priority of KR 10-2013-0105955 filed Sep. 4, 2013 and KR 10-2014-0049196 filed Apr. 24, 2014. The entire disclosures of each of the above applications are incorporated herein by reference.

TECHNICAL FIELD

The present invention relates to an air-conditioner system for a vehicle and a method for controlling the same, and more particularly, to an air-conditioner system for a vehicle and a method for controlling the same which can change a target superheat degree depending on variation in an amount of refrigerant discharged from a compressor, namely, gradually decrease the target superheat degree by stages as the amount of refrigerant discharged from the compressor decreases, and control an electronic expansion valve based on the target superheat degree dropping by stages.

BACKGROUND ART

In general, as shown in FIG. 1, an air-conditioner system for a vehicle includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; an evaporator 4 for exchanging heat between the liquefied refrigerant of low pressure throttled by the expansion valve 3 and evaporating the refrigerant to cool the air discharged to the inside of the vehicle due to heat absorption by evaporative latent heat; and a refrigerant pipe 5 to which the compressor 1, the condenser 2, the expansion valve 3 and the evaporator 4 are connected.

Moreover, a receiver drier (not shown) is mounted between the condenser 2 and the expansion valve 3 to separate the liquid-phase refrigerant from gas-phase refrigerant, so that just the liquid-phase refrigerant is supplied to the expansion valve 3.

The compressor 1 is a variable capacity swash plate type compressor, and it will be described in brief referring to FIG. 2. The variable capacity swash plate type compressor includes: a rotary shaft 10 which is mounted inside the compressor 1 and rotates by operation of an engine; a swash plate 13 which is mounted on the rotary shaft 10 in such a way that an inclination angle is varied, rotates together with the rotary shaft 10 and is connected with a plurality of pistons 14; and an Electronic control valve (ECV) 15 for controlling the inclination angle of the swash plate 13 in order to control an amount of refrigerant discharged.

The ECV 15 is operated by electric control and controls inside pressure of a crank chamber 11 by controlling a flow rate of the refrigerant while guiding the refrigerant of high pressure discharged from a discharge chamber 12. The inclination angle of the swash plate 13 decreases when the inside pressure of the crank chamber 11 increases, but increases when the inside pressure of the crank chamber 11 decreases.

Therefore, the inclination angle of the swash plate 13 is varied by duty control of the ECV 15, and an amount of refrigerant discharged from the compressor 1 is determined by the inclination angle of the swash plate 13. Finally, a load of the air conditioner can be reduced through the duty control of the ECV 15.

In the meantime, the expansion valve 3 may be a mechanical valve or an electronic expansion valve. Hereinafter, as an example, the electronic expansion valve will be described.

The air-conditioner system controls a superheat degree by controlling the flow rate of the refrigerant through control of the compressor 1 and the electronic expansion valve 3 depending on the load of the air conditioner.

In other words, the air-conditioner system sets a target superheat degree according to outdoor temperature or indoor temperature of the vehicle and controls the flow rate of the refrigerant by the control of an ECV duty of the compressor 1 or variation of a degree of opening of the electronic expansion valve 3 in order to converge the target superheat degree.

However, the air-conditioner system causes a change in a superheat degree due to a sudden increase of sensitivity when the electronic expansion valve 3 controls the flow rate of the refrigerant (control of the superheat degree) in a variable area of the compressor 1, for example, an decrease area of the amount of refrigerant discharged from the compressor 1 in a low load condition.

In this instance, when the superheat degree is changed, cooling performance is also changed, and it changes the variable quantity (refrigerant discharge amount) of the compressor 1. Under such a condition, if the degree of opening of the electronic expansion valve 3 is also changed, it is difficult to control the flow rate of the refrigerant and it increases change in the flow rate of the refrigerant. Because of such problems, hunting that the refrigerant beats and generates pulsation occurs, and it causes instability of the system.

FIG. 3 is a graph showing the superheat degree, temperature of air discharged to the inside of the vehicle and the ECV duty of the compressor when the superheat degree is controlled through an electronic expansion valve in the variable area of the compressor. It will be described in brief.

First, in a superheat degree increase section (A), the temperature (° C.) of air discharged to the inside of the vehicle and the ECV duty (%), namely refrigerant discharge amount, of the compressor 1 are increased, and in this instance, the electronic expansion valve 3 greatly increases the degree of opening (refrigerant flow rate) in order to drop the superheat degree.

When the degree of opening of the electronic expansion valve 3 is greatly increased, the superheat degree lowers. In a section (B) where the superheat degree lowers, the temperature (° C.) of air discharged to the inside of the vehicle and the ECV duty (%), namely refrigerant discharge amount, of the compressor 1 are decreased. In this instance, when temperature (° C.) of air discharged from the evaporator 4 drops below zero, the air-conditioner system cuts the compressor 1 off in order to prevent icing of the evaporator 4. When the compressor 1 is turned off, the temperature of the air discharged to the inside of the vehicle increases while the temperature of the air discharged from the evaporator 4 increases, hence cooling performance is deteriorated.

Continuously, when the compressor 1 is turned on due to an increase of the temperature of the air discharged from the evaporator 4, the temperature of the air discharged from the evaporator 4 drops below zero, and then, the compressor 1 is turned off again. This is why the system becomes unstable.

In such an air-conditioner system, cooling performance is deteriorated in a superheat degree over-increase section where the superheat degree increases above the optimum superheat degree (optimum refrigerant flow rate). The refrigerant flow rate in the low load condition (the variable area of the compressor) of the air-conditioner system is smaller than the refrigerant flow rate in a high load condition, a control range of the superheat degree is narrow. Therefore, a control range of the optimum superheat degree area becomes narrow, hence instability possibility of the system increases when a common target superheat degree is controlled.

In other words, the conventional air-conditioner system has a disadvantage in that the system becomes unstable when the target superheat degree is controlled through the electronic expansion valve 3 in the same way as the high load condition, namely at the time of the maximum discharge of the compressor, even though the refrigerant discharge amount is small in the low load condition of the air-conditioner system, namely in the variable area of the compressor 1 where the ECV duty lowers.

DISCLOSURE

Technical Problem

Accordingly, the present invention has been made in an effort to solve the above-mentioned problems occurring in the prior arts, and it is an object of the present invention to provide an air-conditioner system for a vehicle and a method for controlling the same which can change a target superheat degree depending on variation in an amount of refrigerant discharged from a compressor, namely, gradually decrease the target superheat degree as the amount of refrigerant discharged from the compressor decreases, and control an electronic expansion valve based on the lowered target superheat degree, thereby preventing performance degradation of an air conditioner and stabilizing the system by restraining a change in the superheat degree in an area where an amount of refrigerant discharged from a compressor varies.

Technical Solution

To achieve the above objects, the present invention provides an air-conditioner system for a vehicle which includes: a variable capacity compressor; a condenser for condensing refrigerant discharged from the compressor; an electronic expansion valve which expands the refrigerant discharged from the condenser and is controlled in the degree of opening by a control signal of a controller; and an evaporator for evaporating the refrigerant discharged at the electronic expansion valve, and which is controlled to a target superheat degree by a control of the degree of opening of the electronic expansion valve, wherein the controller changes the target superheat degree depending on a variation in an amount of refrigerant discharged from the compressor and controls the electronic expansion valve based on the changed target superheat degree.

In another aspect of the present invention, the present invention provides a method for controlling an air-conditioner system for a vehicle, a variable capacity compressor; a condenser for condensing refrigerant discharged from the compressor; an electronic expansion valve which expands the refrigerant discharged from the condenser and is controlled in the degree of opening by a control signal of a controller; and an evaporator for evaporating the refrigerant discharged at the electronic expansion valve, and which is controlled to a target superheat degree by a control of the degree of opening of the electronic expansion valve, wherein the method includes: a first step of deciding whether an amount of refrigerant discharged from the compressor is below a first set value (A) or not; and a second step of controlling the electronic expansion valve based on a first target superheat degree which is lower than the target superheat degree if the amount of refrigerant discharged from the compressor is below the first set value (A) as a result of the decision of the first step.

Advantageous Effects

According to the present invention, the air-conditioner system for a vehicle and the method for controlling the same can change a target superheat degree depending on a variation in an amount of refrigerant discharged from a compressor, namely, gradually decrease the target superheat degree by stages as the amount of refrigerant discharged from the compressor decreases, and control an electronic expansion valve based on the target superheat degree decreased by stages, thereby preventing performance deterioration of the air-conditioner system and stabilizing the system by restraining a change in the superheat degree in an area where an amount of refrigerant discharged from a compressor varies.

Moreover, the present invention has the structure to limit the change in the refrigerant flow rate at the electronic expansion valve by uniformly maintaining the degree opening of the electronic expansion valve, thereby preventing that the change in the amount of the refrigerant discharged from the compressor and the change in the refrigerant flow rate at the electronic expansion valve occur at the same time.

Furthermore, the present invention can prevent a sudden change in the refrigerant flow rate inside the system because the air-conditioner system according to the present invention has the structure to prevent that the change in the amount of the refrigerant discharged from the compressor and the change in the refrigerant flow rate at the electronic expansion valve occur at the same time.

Additionally, the present invention can prevent hunting due to the sudden change in the refrigerant flow rate, overcome difficulty in "control of refrigerant flow rate" incurred by hunting because the system can prevent the sudden change in the refrigerant flow rate inside the system, thereby enhancing cooling performance inside the vehicle.

MODE FOR INVENTION

Figure 1:
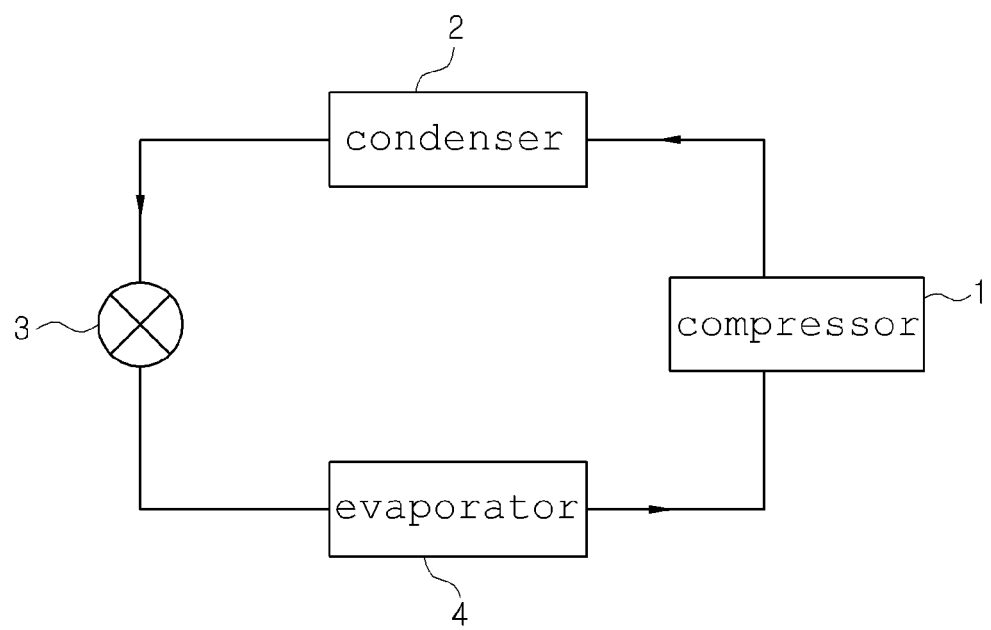
FIG. 1 is a configurative diagram of a conventional air-conditioner system for a vehicle.

Reference will be now made in detail to the preferred embodiment of the present invention with reference to the attached drawings.

First, an air-conditioner system for a vehicle according to a first preferred embodiment of the present invention is configured of a compressor 100, a condenser 110, an electronic expansion valve 120 and an evaporator 130 which are connected to a refrigerant pipe 105 in order, and includes a controller 160 for controlling the electronic expansion valve 120.

The compressor 100 inhales and compresses gas-phase refrigerant discharged from the evaporator 130 and discharges the gas-phase refrigerant in a high-temperature and high-pressure state to the condenser 110 while receiving a driving power from a driving power supply source, such as an engine or a motor to operate.

Figure 2:
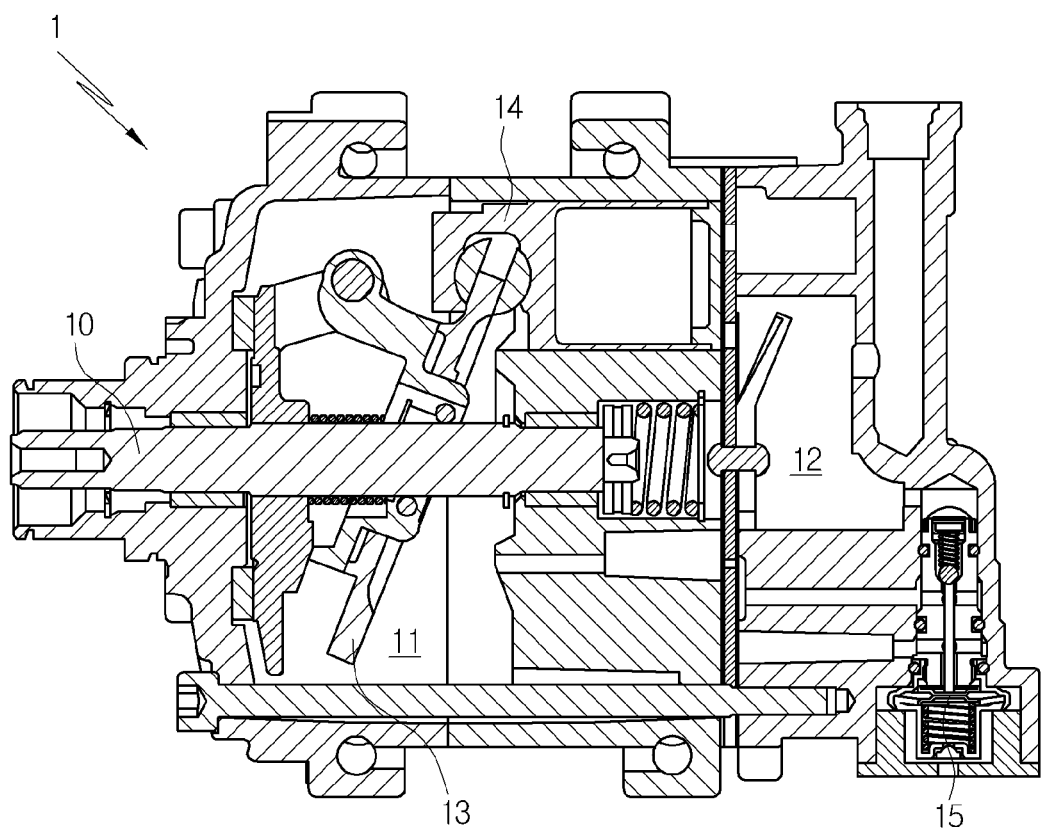
FIG. 2 is a sectional view of a compressor of FIG. 1.
Figure 3:
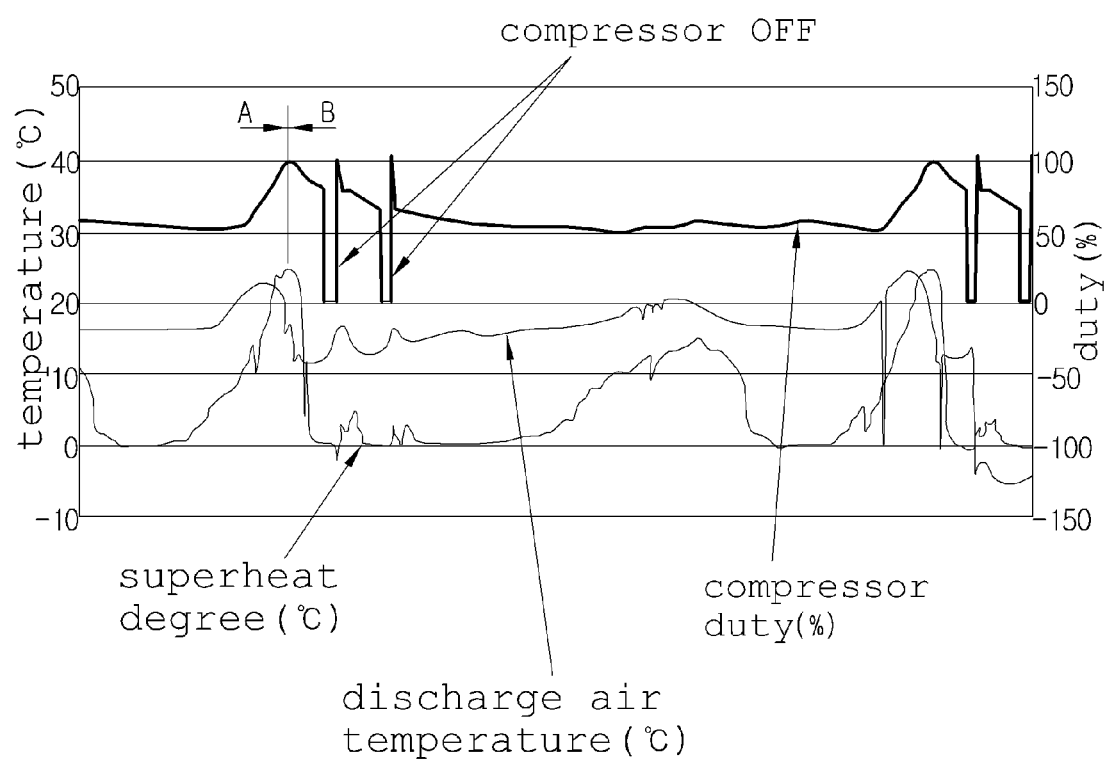
FIG. 3 is a graph showing a superheat degree, temperature of air discharged to the inside of the vehicle and an ECV duty of the compressor when the superheat degree is controlled through an electronic expansion valve in a variable area of the compressor of the conventional air-conditioner system.
Figure 4:
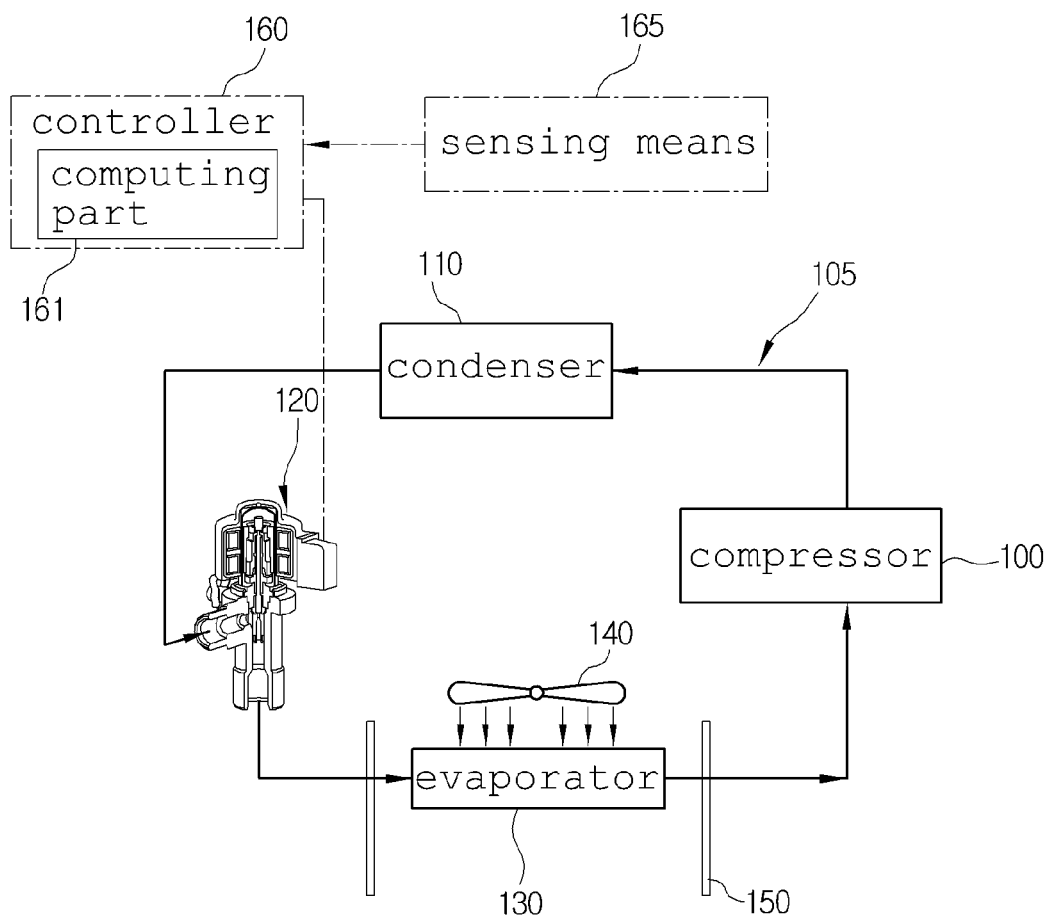
FIG. 4 is a configurative diagram of an air-conditioner system for a vehicle according to a first preferred embodiment of the present invention.
Figure 5:
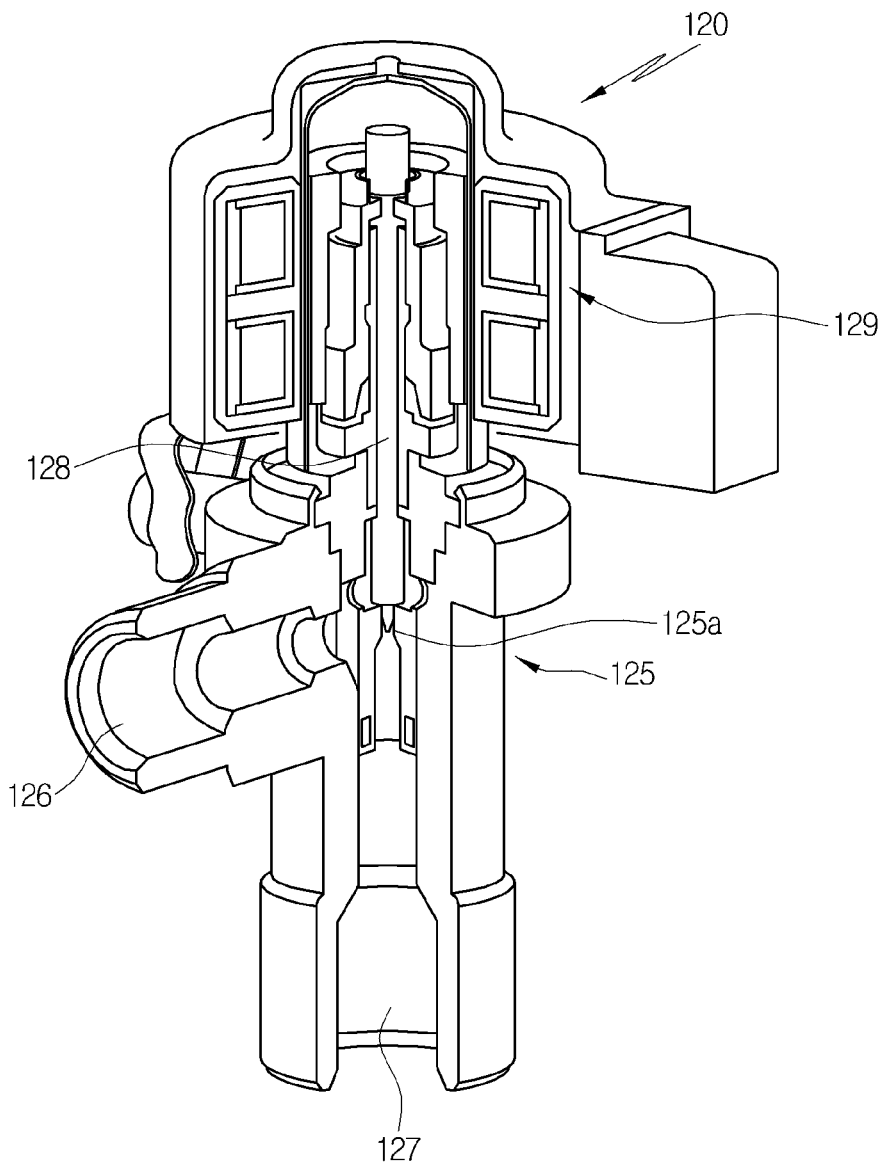
FIG. 5 is a sectional perspective view showing an electronic expansion valve of the air-conditioner system for the vehicle according to the first preferred embodiment of the present invention.
Figure 6:
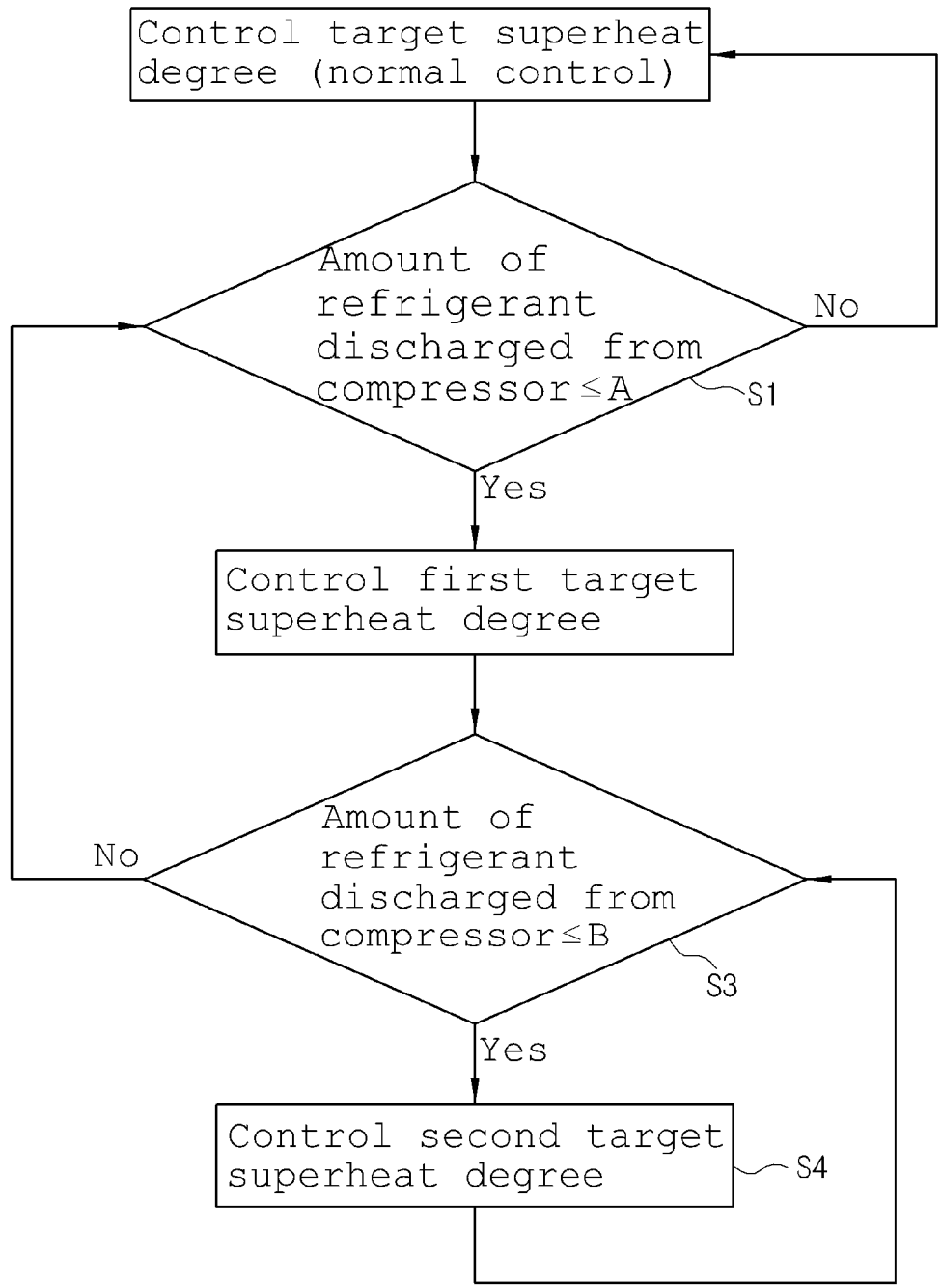
FIG. 6 is a flow chart showing a method for controlling the air-conditioner system for the vehicle according to the first preferred embodiment of the present invention.

The compressor 100 is a variable capacity compressor 100. Referring to FIG. 2, the compressor 100 will be described in brief. The compressor 100 includes: a rotary shaft 10 which is mounted inside the compressor 100 and rotates by driving of an engine; a swash plate 13 which is mounted on the rotary shaft 10 in such a way that an inclination angle varies, rotates together with the rotary shaft 10 and is connected with a plurality of pistons 14; and an electronic control valve (ECV) 15 for controlling the inclination angle of the swash plate 13 to control a refrigerant discharge amount.

The ECV 15 is operated by electric control and controls inside pressure of a crank chamber 11 by controlling a flow rate of the refrigerant while guiding the refrigerant of high pressure discharged from a discharge chamber 12. The inclination angle of the swash plate 13 decreases when the inside pressure of the crank chamber 11 increases, but increases when the inside pressure of the crank chamber 11 decreases.

Therefore, the inclination angle of the swash plate 13 is varied by duty control of the ECV 15, and an amount of refrigerant discharged from the compressor 100 is determined by the inclination angle of the swash plate 13. Finally, a load of the air conditioner, namely cooling load, can be reduced through the duty control of the ECV 15.

In the meantime, the compressor 100 varies the refrigerant discharge amount according to an air-conditioner load. That is, under an air-conditioner high load condition, the swash plate 13 has the maximum inclination angle and the maximum refrigerant discharge amount, but under a low load condition, the duty of the ECV 15 is reduced and the inclination angle of the swash plate 13 is also reduced and varied, hence the refrigerant discharge amount is also reduced and varied.

The condenser 110 heat-exchanges the gas-phase refrigerant of high-temperature and high-pressure discharged from the compressor 100 with the outdoor air to condense the gas-phase refrigerant into liquid of high-temperature and high-pressure, and then, discharges the liquid of high-temperature and high-pressure to the electronic expansion valve 120.

The electronic expansion valve 120 expands the liquid of high-temperature and high-pressure discharged from the condenser 110 to make it into a wet saturated state of low-temperature and low-pressure, and is controlled in degree of opening by the controller 160 to control the refrigerant flow rate. After that, the electronic expansion valve 120 controls the air-conditioner system by a target superheat degree through the control of refrigerant flow rate.

That is, the electronic expansion valve 120 controls the degree of opening and the refrigerant flow rate depending on the target superheat degree of the refrigerant, thereby varying an amount of refrigerant flown into the evaporator 130 actively.

Now, the electronic expansion valve 120 will be described. The electronic expansion valve 120 includes: a main body 125 which is connected with the refrigerant pipe 105 and has an inlet 126 for introducing refrigerant, an outlet 127 for discharging the refrigerant and an orifice 125a formed between the inlet 126 and the outlet 127; a valve shaft 128 which is mounted on an upper part of the orifice 125a of the main body 125 to be able to ascend and descend and accurately controls the degree of opening of the orifice 125a in order to expand the refrigerant passing the orifice 125a and control a flow rate of the refrigerant; and a stepping motor 129 which is mounted on an upper part of the main body 125 to make the valve shaft 128 ascend and descend.

Therefore, the electronic expansion valve 120 expands the liquid-phase refrigerant of high-temperature and high-pressure discharged from the condenser 110 and supplies it to the evaporator 130 by controlling the flow rate of the refrigerant.

In the meantime, it is preferable that the condenser 110 have a receiver driver (not shown) mounted at an exit to separate the liquid-phase refrigerant from the gas-phase refrigerant so that just the liquid-phase refrigerant can be supplied to the electronic expansion valve 120.

The evaporator 130 is provided with the refrigerant expanded and discharged from the electronic expansion valve 120 and evaporates the refrigerant. The refrigerant supplied to the evaporator 130 exchanges heat with the air blown to the inside of the vehicle through a blower 140 to be evaporated so as to cool the air discharged to the inside of the vehicle due to heat absorption by evaporative latent heat of the refrigerant.

The evaporator 130 is mounted inside an air-conditioning case 150.

Moreover, the controller 160 regulates the degree of opening of the electronic expansion valve 120 to control the air-conditioner system to the target superheat degree. In other words, the controller 160 computes the superheat degree through temperature and pressure of the refrigerant discharged from the evaporator 130, monitors the superheat degree and controls the degree of opening of the electronic expansion valve 120 to be converged to the target superheat degree.

Meanwhile, the target superheat degree is set according to the outdoor temperature or the indoor temperature of the vehicle or other peripheral variables. The superheat degree decreases when the degree of opening of the electronic expansion valve 120 increases, but increases when the degree of opening decreases.

Furthermore, the present invention restrains a change in the superheat degree in a variable area of the compressor 100 where the refrigerant discharge amount varies, for example, a low load condition of the air condition is reduced the refrigerant discharge amount of the compressor 100 compared with a high load condition (maximum discharge of refrigerant), thereby preventing performance degradation of the air conditioner and stabilizing the system.

For this, sensing means 165 for sensing the amount of refrigerant discharged from the compressor 100 is disposed.

The sensing means 165 includes an ECV duty sensor (not shown) for sensing an "ECV duty" of the compressor 100.

The ECV duty sensor senses the "ECV duty" of the compressor 100 to sense the present inclination angle of the swash plate 13 of the compressor 100, thereby sensing the present amount of refrigerant discharged from the compressor 100.

In the meantime, it is preferable that the sensing means 165 sense the amount of refrigerant discharged from the compressor 100 in seconds.

In addition, the controller 160 includes a computing part 161, changes the target superheat degree depending on a variation in the amount of refrigerant discharged from the compressor 100 and controls the electronic expansion valve 120 based on the changed target superheat degree.

In this instance, the controller 160 controls the electronic expansion valve 120 based on the changed target superheat degree, namely a first target superheat degree and a second target superheat degree which will be described later, in multiple stages.

In other words, in order to stabilize the air-conditioner system, the controller 160 carries out hysteresis control to gradually decrease the target superheat degree by stages as the variation of the compressor 100, namely the amount of refrigerant discharged from the compressor 100, decreases. Of course, the controller 160 controls to increase the target superheat degree by stages as the amount of refrigerant discharged from the compressor 100 increases.

In more detail, when the amount of refrigerant discharged from the compressor 100 is below a first set value (A), the controller 160 controls the degree of opening of the electronic expansion valve 120 based on the first target superheat degree which is lower than the target superheat degree.

In other words, when the amount of refrigerant discharged from the compressor 100 is below the first set value (A), the controller computes the first target superheat degree which is lower than the target superheat degree of the previous normal control and controls the degree of opening of the electronic expansion valve 120 based on the first target superheat degree. In this instance, the controller 160 increases the degree of opening of the electronic expansion valve 120 to be converged to the first target superheat degree which is lower than the target superheat degree.

Continuously, when the amount of refrigerant discharged from the compressor 100 is below a second set value (B), the controller 160 controls the electronic expansion valve 120 based on the second target superheat degree which is lower than the first target superheat degree.

In other words, after the controller 160 controls the electronic expansion valve 120 to be converged to the first target superheat degree, when the amount of refrigerant discharged from the compressor 100 is below the second set value (B), the controller 160 computes the second target superheat degree which is lower than the first target superheat degree and controls the degree of opening of the electronic expansion valve 120 based on the second target superheat degree. In this instance, the controller 160 increases the degree of opening of the electronic expansion valve 120 more than the degree of opening at the time of the first target superheat degree to be converged to the second target superheat degree which is lower than the first target superheat degree.

The first set value (A) and the second set value (B) are fixed values and are inputted to the controller 160 in advance.

As described above, when the amount of refrigerant discharged from the compressor 100 decreases in the variable area of the compressor 100, the present invention does not control the electronic expansion valve 120 with the same target superheat degree when the compressor 100 discharges refrigerant to the maximum but controls the electronic expansion valve 120 in multiple stages by dropping the target superheat degree by stages as the amount of refrigerant discharged from the compressor 100 decreases, thereby restraining the change in the superheat degree in the variable area of the compressor 100 to prevent performance degradation of the air conditioner and stabilize the system.

In the meantime, in a case that the amount of refrigerant discharged from the compressor 100 in the variable area of the compressor 100, it is preferable to control the target superheat degree in multiple stages by increasing the target heat degree by stages as the amount of refrigerant discharged from the compressor 100 increases.

Hereinafter, a method for controlling the air-conditioner system for the vehicle according to the first preferred embodiment of the present invention will be described.

When the air-conditioner system is operated, the controller 160 carries out the following steps while carrying out a normal control so that the superheat degree of the refrigerant discharged from the evaporator 130 is converged to the target superheat degree through the control of the degree of opening of the electronic expansion valve 120.

First, a first step (S1) of deciding whether the amount of refrigerant discharged from the compressor 100 is below the first set value (A) or not is carried out.

In the first step (S1), it is decided whether the compressor 100 is in the maximum discharge of refrigerant or in a variable discharge of refrigerant, in other words, it is decided whether the variable amount of refrigerant is below the first set value (A) or not.

As a result of the decision of the first step (S1), if the amount of refrigerant discharged from the compressor 100 is below the first set value (A), a second step (S2) of controlling the degree of opening of the electronic expansion valve 120 based on the first target superheat degree which is lower than the target superheat degree is carried out.

In the second step (S2), if the amount of refrigerant discharged from the compressor 100 is below the first set value (A), the controller computes the first target superheat degree which is lower than the target superheat degree of the previous normal control and controls the degree of opening of the electronic expansion valve 120 based on the first target superheat degree. In this instance, the controller 160 increases the degree of opening of the electronic expansion valve 120 to be converged to the first target superheat degree which is lower than the target superheat degree.

Continuously, after the second step (S2), a third step (S3) of deciding whether the amount of refrigerant discharged from the compressor 100 is below the second set value (B) or not is carried out.

In the third step (S3), it is decided whether the amount of refrigerant discharged from the compressor 100 is decreased further in the state where the air-conditioner system is controlled with the first target superheat degree, in other words, it is decided whether the variable amount of refrigerant discharged is below the second set value (B).

As a result of decision of the third step (S3), if the amount of refrigerant discharged from the compressor 100 is below the second set value (B), a fourth step (S4) of controlling the electronic expansion valve 120 based on the second target superheat degree which is lower than the first target superheat degree is carried out.

In the fourth step (S4), after the electronic expansion valve 120 is controlled to be converged to the first target superheat degree, if the amount of refrigerant discharged from the compressor 100 is below the second set value (B), the controller 160 computes the second target superheat degree which is lower than the first target superheat degree and controls the degree of opening of the electronic expansion valve 120 based on the second target superheat degree. In this instance, the controller 160 increases the degree of opening of the electronic expansion valve 120 more than the degree of opening at the time of the first target superheat degree to be converged to the second target superheat degree which is lower than the first target superheat degree.

Meanwhile, till now, it is described that the amount of refrigerant discharged from the compressor 100 decreases in the variable area of the compressor 100, but when the amount of refrigerant discharged from the compressor 100 increases in the variable area of the compressor 100, the target superheat degree increases by stages to be controlled in multiple stages as the amount of refrigerant discharged from the compressor 100 increases.

Figure 7:
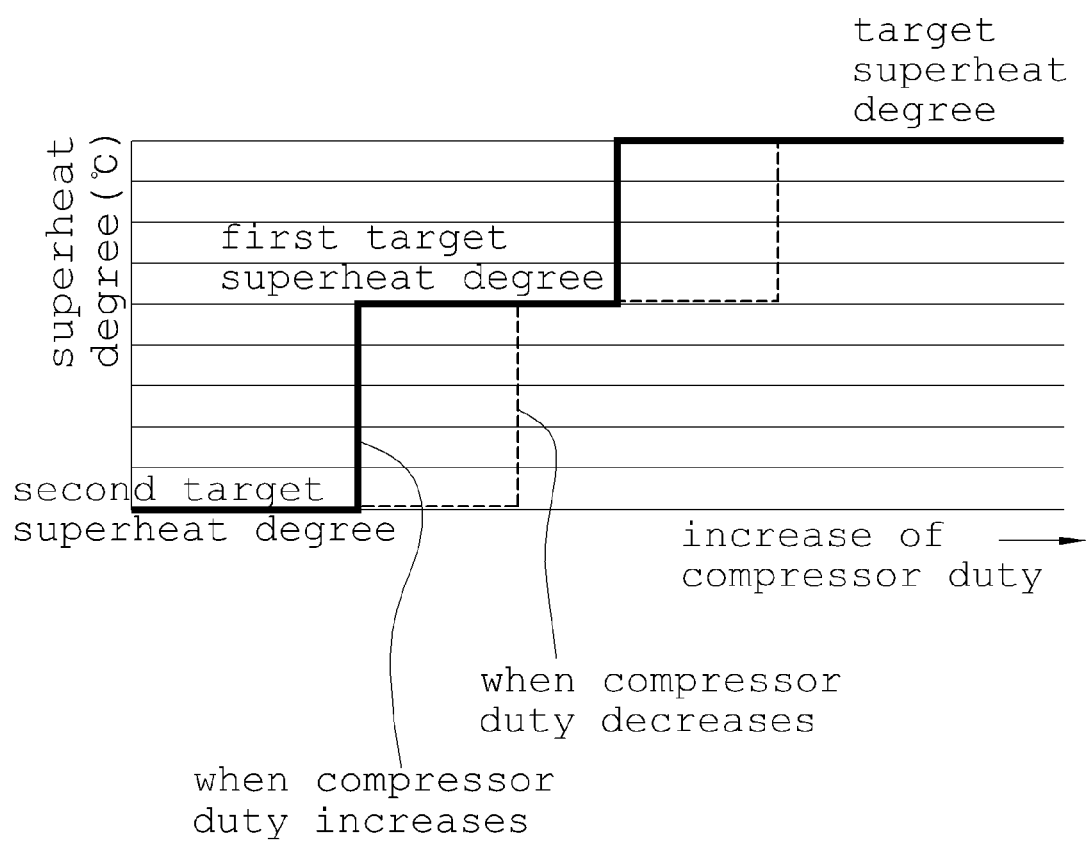
FIG. 7 is a graph showing the superheat degree depending on a compressor duty in the air-conditioner system for the vehicle according to the first preferred embodiment of the present invention.

In this instance, as shown in FIG. 7, the hysteresis control is carried out when the superheat degree drops by stages in order of the target superheat degree, the first target superheat degree and the second target superheat degree according to the decrease of the amount of refrigerant discharged from the compressor 100 (decrease of compressor duty) and when the superheat degree rises by stages in order of the second target superheat degree, the first target superheat degree and the target superheat degree according to the increase of the amount of refrigerant discharged from the compressor (increase of compressor duty).

As described above, under the condition that the amount of refrigerant discharged from the compressor 100 varies, the system controls the target superheat degree in multiple stages (hysteresis control) by dropping the target superheat degree by stages according to the amount of refrigerant discharged from the compressor 100 so as to restrain the change in the superheat degree, thereby preventing performance degradation of the air conditioner and stabilizing the system.

Figure 8:
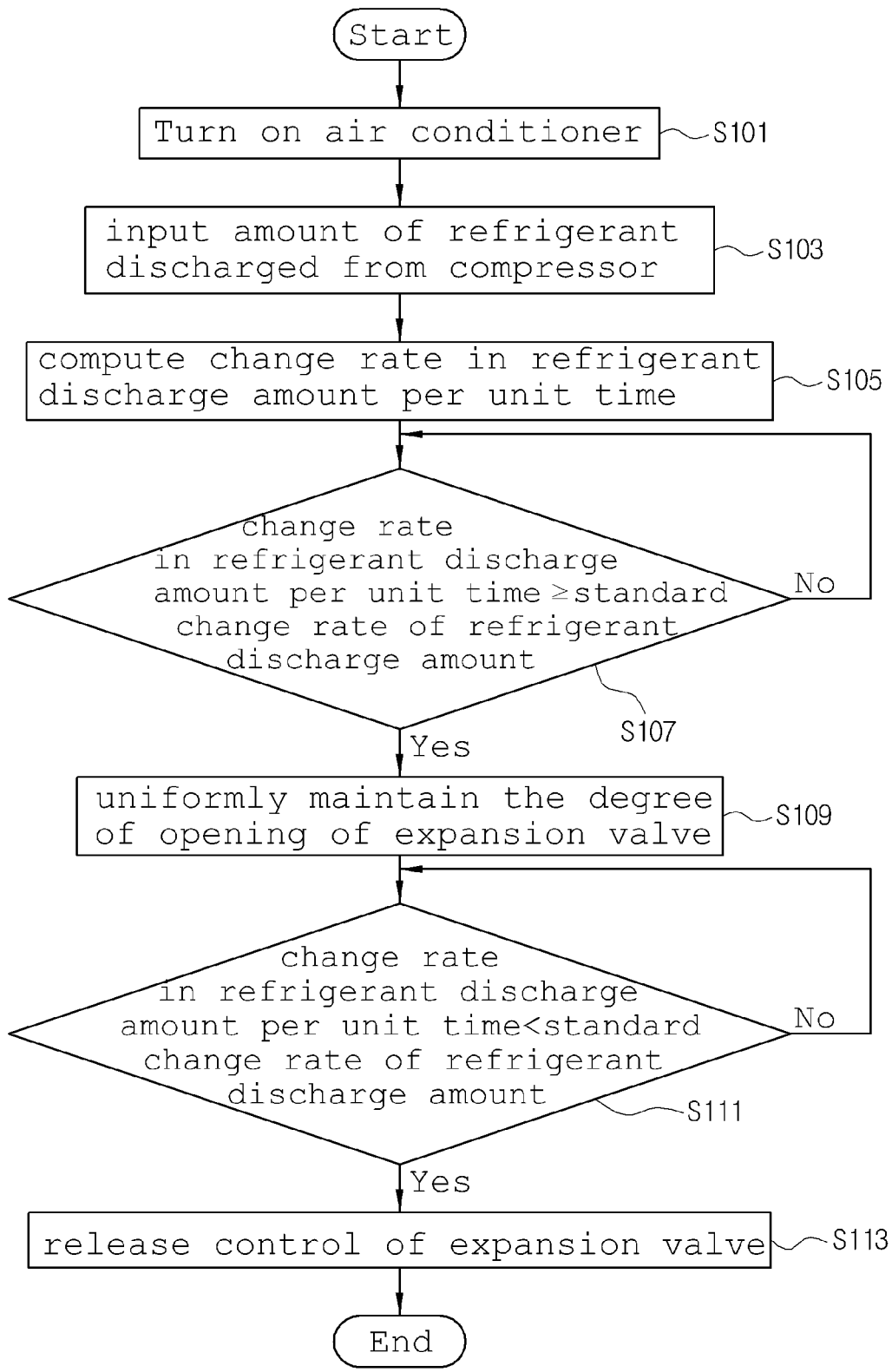
FIG. 8 is a flow chart showing a method for controlling an air-conditioner system for a vehicle according to a second preferred embodiment of the present invention.

FIG. 8 is a flow chart showing a method for controlling an air-conditioner system for a vehicle according to a second preferred embodiment of the present invention.

In the second preferred embodiment, when the "amount of refrigerant discharged from the compressor" is inputted from the sensing means 165 by seconds, the computing part 161 of the controller 160 arithmetically operates "amounts of refrigerant discharged from the compressor" by seconds and computes a "change rate in the refrigerant discharge amount per unit time". For instance, the "change rate in the refrigerant discharge amount" for two minutes from the point of time before two minutes to the present point of time is calculated.

In the meantime, when the computing part 161 computes the "change rate in the refrigerant discharge amount per unit time", the controller 160 compares the "change rate in the refrigerant discharge amount per unit time" with a "standard change rate in the refrigerant discharge amount" which has been stored previously, and decides whether or not the "change rate in the refrigerant discharge amount per unit time" is above the "standard change rate in the refrigerant discharge amount".

As a result of decision, if the "change rate in the refrigerant discharge amount per unit time" is above the "standard change rate in the refrigerant discharge amount", the controller 160 decides that there is a concern about a severe hunting due to a sudden change in the refrigerant flow rate in a case that the degree of opening of the electronic expansion valve 120 is varied because the present amount of refrigerant discharged from the compressor 100 frequently varies.

Moreover, when such a decision is made, the controller 160 enters a "hunting prevention mode" and forcedly controls the electronic expansion valve 120. Especially, the controller 160 forcedly controls in such a way that the degree of opening of the orifice 125a can uniformly maintain the degree of opening when the "hunting prevention mode" starts.

Therefore, the present invention prevents that the variation in the amount of refrigerant discharged from the compressor 100 and the variation in the flow rate of the discharged refrigerant at the electronic expansion valve 120 occur at the same time. Accordingly, the present invention prevents the sudden change in the entire refrigerant flow rate due to the variation in the amount of refrigerant discharged from the compressor 100 and the variation in the flow rate of the discharged refrigerant at the electronic expansion valve 120.

As a result, the present invention prevents hunting by the sudden change in the refrigerant flow rate. Therefore, the present invention can overcome difficulty in "control of refrigerant flow rate" due to hunting and enhance cooling performance inside the vehicle.

Meanwhile, because the amount of refrigerant discharged from the compressor 100 does not frequently vary when the computed "change rate in the refrigerant discharge amount per unit time" is under the "standard change rate in the refrigerant discharge amount", the controller 160 decides that there is no concern about hunting because there is no sudden change in the refrigerant flow rate even though the degree of opening of the electronic expansion valve 120 varies.

Furthermore, according to the decision, the controller 160 is released from the "hunting prevention mode" and releases the forced control of the electronic expansion valve 120. Therefore, the degree of opening of the electronic expansion valve 120 can be automatically controlled to an original state.

Hereinafter, referring to FIG. 8, actions of the air-conditioner system for the vehicle according to the second preferred embodiment of the present invention will be described.

First, when the air conditioner is turned on (S101), the amount of refrigerant discharged from the compressor 100 is inputted from the sensing means 165 (S103).

After that, the controller 160 arithmetically operates the inputted "amount of refrigerant discharged from the compressor", and computes the "change rate in the refrigerant discharge amount per unit time" (S105).

Moreover, when the "change rate in the refrigerant discharge amount per unit time" is computed, the controller 160 decides whether or not the "change rate in the refrigerant discharge amount per unit time" is above the previously set "standard change rate in the refrigerant discharge amount" (S107).

As a result of the decision, if the "change rate in the refrigerant discharge amount per unit time" is above the "standard change rate in the refrigerant discharge amount", the controller 160 enters the "hunting prevention mode" and forcedly controls the electronic expansion valve 120 to uniformly maintain the degree of opening of the electronic expansion valve 120.

Then, the present invention prevents that the variation in amount of the refrigerant discharged from the compressor and the variation in refrigerant flow rate at the electronic expansion valve occur at the same time. Therefore, the present invention prevents a sudden change in the refrigerant flow rate depending on the variation in amount of the refrigerant discharged from the compressor and the variation in refrigerant flow rate at the electronic expansion valve. As a result, hunting by the sudden change in the refrigerant flow rate is prevented.

In the meantime, the controller 160 decides again whether or not the "change rate in the refrigerant discharge amount per unit time" is under the "standard change rate in the refrigerant discharge amount" (S111).

As a result of the decision, if the "change rate in the refrigerant discharge amount per unit time" is under the "standard change rate in the refrigerant discharge amount", the controller 160 is released from the "hunting prevention mode" and releases the forced control of the electronic expansion valve 120 (S113). Accordingly, the degree of opening of the electronic expansion valve 120 can be automatically controlled to the original state.

As described above, the present invention has the structure to limit the change in refrigerant flow rate at the electronic expansion valve 120 by uniformly maintaining the degree opening of the electronic expansion valve 120, thereby preventing that the change in amount of the refrigerant discharged from the compressor 100 and the change in the refrigerant flow rate at the electronic expansion valve 120 occur at the same time.

Furthermore, the present invention can prevent a sudden change in the refrigerant flow rate inside the system because the air-conditioner system according to the present invention has the structure to prevent that the change in the amount of the refrigerant discharged from the compressor 100 and the change in the refrigerant flow rate at the electronic expansion valve 120 occur at the same time.

Additionally, the present invention can prevent hunting due to the sudden change in the refrigerant flow rate, overcome difficulty in "control of refrigerant flow rate" incurred by hunting because the system can prevent the sudden change in the refrigerant flow rate inside the system, thereby enhancing cooling performance inside the vehicle.

While the present invention has been particularly shown and described with reference to exemplary embodiments thereof, it will be understood by those of ordinary skill in the art that the scope of the present invention is not limited to the specific embodiments but various changes in form and details may be made therein without departing from the scope of the present invention as defined by the following claims.

The invention claimed is:

1. An air-conditioner system for a vehicle which comprises: a variable capacity compressor; a condenser for condensing refrigerant discharged from the compressor; an electronic expansion valve which expands the refrigerant discharged from the condenser and is controlled in the degree of opening by a control signal of a controller; and an evaporator for evaporating the refrigerant discharged at the electronic expansion valve and which is controlled to a target superheat degree by a control of the degree of opening of the electronic expansion valve;

wherein the controller is configured to change the target superheat degree depending on a variation in an amount of refrigerant discharged from the compressor and control the electronic expansion valve based on the changed target superheat degree;

wherein the compressor operates in a variable area to vary the amount of refrigerant discharged and the controller restrains a change in the superheat degree by decreasing the target superheat degree in response to a decrease in the amount of refrigerant discharged from the compressor operating in the variable area;

wherein when an amount of refrigerant discharged from the compressor is below a first set value (A), the controller controls the degree of opening of the electronic expansion valve based on a first target superheat degree which is lower than the target superheat degree; and wherein when the amount of refrigerant discharged from the compressor is below a second set value (B), the controller controls the degree of opening of the electronic expansion valve based on a second target superheat degree which is lower than the first target superheat degree; and wherein the controller controls the electronic expansion valve in multiple stages by dropping the target superheat degree by stages as the amount of refrigerant discharged from the compressor decreases.

2. The air-conditioner system according to claim 1, further comprising:

a sensing means in communication with the controller for sensing the amount of refrigerant discharged from the compressor by seconds; and the controller being configured to compute the change rate in the amount of refrigerant discharged from the compressor per unit time through the amount of refrigerant discharged from the compressor which is inputted from the sensing means by seconds.

3. The air-conditioner system according to claim 2, wherein if a change rate in the amount of refrigerant discharged from the compressor per unit time by the computation of the controller is above a standard change rate of the refrigerant discharge amount previously set, the controller enters a hunting prevention mode and forcedly controls the degree of opening of the electronic expansion valve.

4. The air-conditioner system according to claim 3, wherein the controller controls the degree of opening of the electronic expansion valve when the hunting prevention mode starts so that the degree of opening at the time of the start of the hunting prevention mode can be kept constant.

5. The air-conditioner system according to claim 2, wherein if the change rate in the amount of refrigerant discharged from the compressor per unit time is under a standard change rate of the refrigerant discharge amount, the controller is released from a hunting prevention mode and releases a forced control of the electronic expansion valve.

6. The air-conditioner system according to claim 1, wherein the controller decreases the target superheat degree in response to a decrease in the amount of refrigerant discharged from the compressor in a predetermined period of time as determined by one of a sensing means in communication with the controller for sensing the amount of refrigerant discharged from the compressor or a sensing means in communication with the controller for sensing a signal controlling the amount of refrigerant discharged from the compressor.

7. A method for controlling an air-conditioner system for a vehicle, which comprises: a variable capacity compressor; a condenser for condensing refrigerant discharged from the compressor; an electronic expansion valve which expands the refrigerant discharged from the condenser and is controlled in the degree of opening by a control signal of a controller; and an evaporator for evaporating the refrigerant discharged at the electronic expansion valve, and, which is controlled to a target superheat degree by a control of the degree of opening of the electronic expansion valve, the method comprising:

wherein the controller changes the target superheat degree depending on a variation in an amount of refrigerant discharged from the compressor and controls the electronic expansion valve based on the changed target superheat degree;

wherein the compressor operates in a variable area to vary the amount of refrigerant discharged and the controller restrains a change in the superheat degree by decreasing the target superheat degree in response to a decrease in the amount of refrigerant discharged from the compressor operating in the variable area;

wherein when an amount of refrigerant discharged from the compressor is below a first set value (A), the controller controls the degree of opening of the electronic expansion valve based on a first target superheat degree which is lower than the target superheat degree; and wherein when the amount of refrigerant discharged from the compressor is below a second set value (B), the controller controls the degree of opening of the electronic expansion valve (120) based on a second target superheat degree which is lower than the first target superheat degree;

wherein the controller controls the electronic expansion valve in multiple stages by dropping the target superheat degree by stages as the amount of refrigerant discharged from the compressor decreases by performing the following steps;

a first step of deciding whether an amount of refrigerant discharged from the compressor is below a first set value (A) or not;

a second step of controlling the electronic expansion valve based on a first target superheat degree which is lower than the target superheat degree if the amount of refrigerant discharged from the compressor is below the first set value (A) as a result of the decision of the first step (S1);

a third step of deciding whether the amount of refrigerant discharged from the compressor is below a second set value (B) or not, after the second step; and a fourth step of controlling the electronic expansion valve based on a second target superheat degree which is lower than the first target superheat degree if the amount of refrigerant discharged from the compressor is below the second set value (A) as a result of the decision of the third step.

\* \* \* \* \*